Nov. 4, 1952     K. R. HOFLAND     2,616,169
CUTTING PLATE OF DRY-SHAVING DEVICES
Filed May 3, 1946     2 SHEETS—SHEET 1
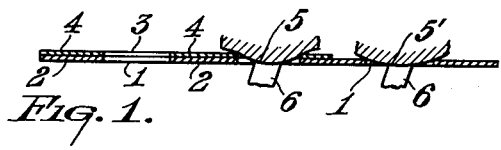
Fig. 1.
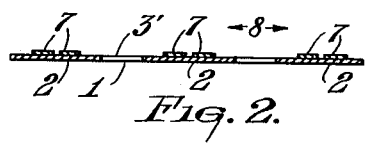
Fig. 2.
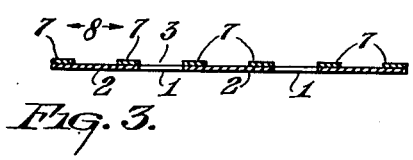
Fig. 3.
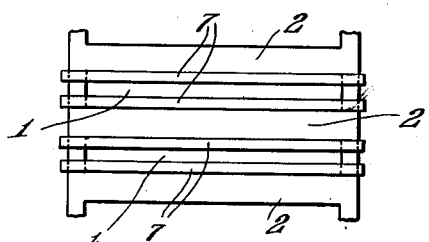
Fig. 4.
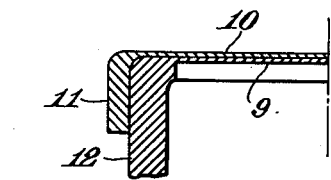
Fig. 5.
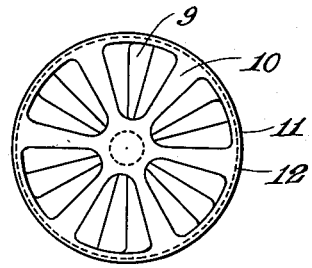
Fig. 6.
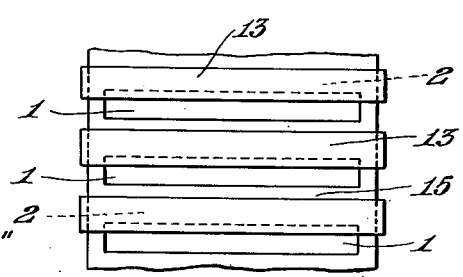
Fig. 7.
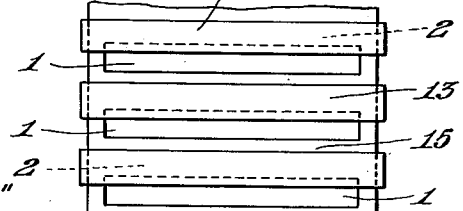
Fig. 9.
Fig. 8.
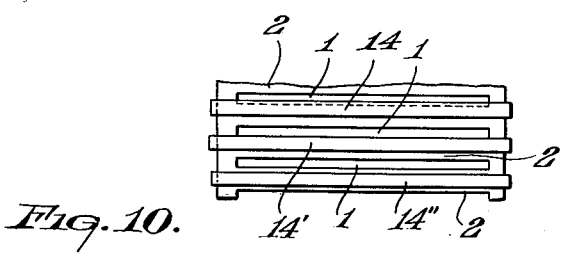
Fig. 10.
INVENTOR.
KAREL R. HOFLAND.
BY
AGENT.

Nov. 4, 1952 K. R. HOFLAND 2,616,169
CUTTING PLATE OF DRY-SHAVING DEVICES
Filed May 3, 1946 2 SHEETS—SHEET 2

INVENTOR.
KAREL R. HOFLAND
BY
AGENT.

Patented Nov. 4, 1952

2,616,169

UNITED STATES PATENT OFFICE 2,616,169

CUTTING PLATE OF DRY-SHAVING DEVICES

Karel Reinout Hofland, Eindhoven, Netherlands, assignor, by mesne assignments, to Hartford National Bank and Trust Company, Hartford, Conn., as trustee Application May 3, 1946, Serial No. 667,197
In the Netherlands May 28, 1942

Section 1, Public Law 690, August 8, 1946
Patent expires May 28, 1962

3 Claims. (Cl. 30—43)

This invention relates to an apertured cutting plate of a dry-shaving device which is more particularly characterized in that the hair cutting action of the cutting plate for the skin and/or the hairs is adjustable.

According to one aspect of the invention the adjustability of the cutting action of the cutting plate is obtained by variation of the thickness of the cutting plate formed by two or more superposed plates. This may be effected for example by the removal of one of these plates. It is also possible to alter the thickness only at the area of the apertures by shifting one of the plates or parts thereof in such manner that the aperture is circumscribed by the other plate only.

According to a further aspect of the invention the adjustability of the cutting action of the cutting plate is obtained by means of one or more adjustable dimensions of the apertures.

The cutting action of the cutting plates hitherto known for the skin and the hairs, apart from being determined by the form which may be altered to accord with characteristics of the human face is determined solely by the value, adjusted once for all, of the thickness of the cutting plate and the dimensions of the apertures which are understood to include the form thereof. It has been found that this adjustment results in an aggregate cutting action of the said plate which is serviceable for a part of mankind whose skin and hairs have the same properties and thickness and suppleness of the skin, density of the hair growth, hair thickness, and so forth. Since dry-shaving devices are known and commercially obtainable in the most divergent forms the public is forced to choose between a device having a cutting plate which ensures better shaving result at the expense of a greater or less irritation of the skin and a device having a cutting plate by means of which irritation of the skin can be avoided, but at the expense of the shaving result. The most ideal cutting plate for a given skin and hair growth will therefore be capable of being sufficiently provided so as to give complete satisfaction in a few cases only. The present invention, however, permits of obtaining a choice in regard to practically any skin and any hair growth and this is of essential importance.

Obviously, the variations as regards the thickness of the cutting plate or the dimensions of the apertures need only be very slight to ensure a sufficient effect. In the use of slits with a cutting plate thickness of for example about 0.08 mm. even a slit width variation of normally from 0.23 to 0.24 mm. into for example 0.30 mm. will be considered very radical although there is only an absolute variation of from 0.06 to 0.07 mm.

In order that the invention may be clearly understood and readily carried into effect it will now be described more fully with reference to the accompanying drawing, in which some few schematically shown examples of construction are illustrated.

Fig. 1 is a sectional view of the cutting plate arranged according to my invention.

Fig. 2 is a sectional view of three relatively movable cutting plates arranged according to my invention.

Fig. 3 is a view of the plates of Fig. 2 in a moved position.

Fig. 4 is a top plan view of the plates shown in Fig. 2.

Fig. 5 is a sectional view of the cutting plates of Fig. 2. in interfitting circular form so as to be used in a circular shaving head.

Fig. 6 is a top plan view of the arrangement shown in Fig. 5.

Fig. 7 is a sectional view of the further arrangement of the cutting plates of Fig. 1.

Fig. 8 is a top plan view of the cutting plates of Fig. 7.

Fig. 9 is a sectional view of still another arrangement of the cutting plates of Fig. 1.

Fig. 10 is a top plan view of the arrangement of Fig. 9.

Figure 11:
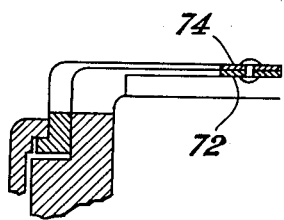
Fig. 11 is a sectional view of the cutting plates of Fig. 4 adapted to a circular cutting plate.

Fig. 1 shows a part of the apertured cutting plate 2 which on that side which is to be applied to the skin supports a second cutting plate 4 provided with apertures 3. The apertures 3 may be circular or oval-shaped or may constitute the cross-sectional area of comparatively long continuous slits.

The cutting action for the skin 5 with a hair 6 is determined by the thickness of the cutting plates 2 and 4 and by the dimensions as well as the form of the apertures 1 and 3 and is varied in this embodiment by the removal of the cutting plate 4 as shown at the right hand end of Figure 1. This enables a not very supple skin 5' to penetrate to a sufficient extent into the aperture 1 to permit of the hair 6 being severed at the foot. In this case, the cutting plate 4 may be constructed as a small separate cap or lid, for example a removable cap or lid.

Referring to Figures 2, 3, and 4, the upper cutting plate is provided with small thin bars 7 which are capable of being shifted in the direction of the arrows 8, as shown in Figure 3. Thus, the desired thickness variation of the cutting plate is only obtained at the area of the apertures, the apertures 3' of Figure 2 being chosen to be sufficiently larger than the apertures 3 of Figure 3 to produce the desired shaving effect.

The measure adopted in Fig. 1 with cutting plates of elongated rectangular shape is adopted in Figures 5 and 6 with a circular shaving head 9 associated with a rotary shaving member or a shaving member reciprocating about an axis which is not shown for the sake of simplicity. In this case, the upper cutting plate 10 is formed by a small removable cap 11 which is frictionally secured to the supporting outer wall 12 of the cutting plate 9.

Referring to Figures 7 and 8, the cutting action for the skin is not altered, as in the preceding figures, by thickness variation of the cutting plate but by variation of one or both dimensions of the apertures 1. For this purpose the upper cutting plate 13 is shifted in such manner that the apertures 1 are partly covered and the open surface area is consequently lessened.

Figures 9 and 10 show a combination of a variation in thickness of the cutting plate and a variation of the dimensions of the apertures. To the left in the Figure 9 the upper cutting plate 14 partly covers the aperture 1. Centrally of the figure, the largest aperture possible is obtained by displacement to the right of the cutting plate 14' whereas a still further displacement to the right (14") only results in a reduction in thickness of the cutting plate which has the effect of still further increasing the cutting action.

This combination is also already obtained in part by Fig. 7 in which the reduction in thickness at 15 is, however, again compensated for by the aperture 1 being covered by the cutting plate 13.

As a matter of course the use of further constructions already known in the industry for simultaneous and uniform shifting or rotation of a number of elements is possible.

Figure 12:
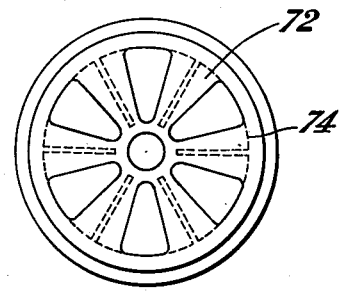
Fig. 12 is a top plan view of the arrangement of Fig. 11.

Referring to Figures 11 and 12, the principle as shown in Figs. 7 and 9 is adopted with a circular cutting plate 72, the variation in thickness and in the dimensions of the apertures being obtained by rotation of the upper cutting plate 74. In all of the preceding cases it is also possible to shift or to rotate the lower cutting plate alone or else jointly with the upper cutting plate, the construction becoming, however, generally more involved thereby.

Figure 13:
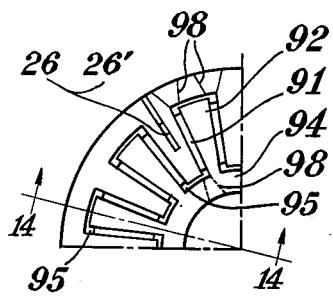
Fig. 13 is a top plan view of inner fitting spoke-like cutting plates.
Figure 14:
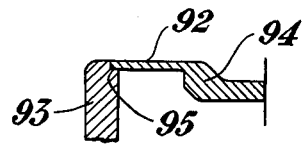
Fig. 14 is a sectional view taken along the line 14—14 of Fig. 13.

Figs. 13 and 14 show a still further embodiment in which the bars 92 are rigidly secured alternately to the outer and inner rings 93 and 94 respectively with the result that a mechanically more resistant construction of the aggregate is obtained. The free ends of the bars are supported for example at 95. A disadvantage of this construction consists in that if a slit is widened the adjoining slits are correspondingly narrowed so that only half the slits can be widened. After the face skin is shaved with the use of the normal slit width the cutting action is improved by rotation of one of the rings 93 and 94 and one can shave with the slits which are widened thereby, said widened slits comprising only half the total number of slits.

As before, tapered openings for the slits may in addition be formed in the rings 93 and 94, as is shown at 98.

If two or more superposed cutting plates are used the thickness of each of these cutting plates may be for example of the order of from 0.04 to 0.08 mm.

It is well to note that the invention is by no means limited to the use of a large number of apertures or slits but is also important with constructions comprising only one or a few adjustable slits, which may have added to them unadjustable apertures. It is also possible to substitute for the pivots in the preceding examples of construction bending points, if the bars are secured to one of the ends or to both for example by means of small blade springs which allow of bending instead of rotation.

What I claim is:

1. Dry shaving apparatus, comprising a substantially flat shaving head member provided with at least two interfitting relatively movable apertured cutting plates, the relative position of the said plates being adjustable to control the size of the apertures in said plates in order to vary the shaving action of the said member.

2. Dry shaving apparatus, comprising a shaving head member provided with at least two substantially flat relatively movable interfitting cutting plates, each of said plates being provided with a plurality of spaced apart shaving bar portions, the position of the said plates being adjustable to control the size of the spacing in order to vary the shaving action of the said member.

3. Dry shaving apparatus, comprising a shaving head member to be used together with a cutting member, said head member being provided with at least two substantially flat interfitting circular apertured cutting plates, said plates being mounted for relative rotary motion, the cutting acton of the said plates being changed by a relative rotary motion of the cutting plates to vary the size of said apertures.

KAREL REINOUT HOFLAND.

REFERENCES CITED

The following references are of record in the file of this patent:

UNITED STATES PATENTS

| Number | Name | Date |
| --- | --- | --- |
| 1,211,273 | Ard | Jan. 2, 1917 |
| 1,420,943 | Philp | June 27, 1922 |
| 2,082,987 | Steinhilper | June 8, 1937 |
| 2,223,286 | Johnson | Nov. 26, 1940 |
| 2,246,459 | Bahr | June 17, 1941 |
| 2,324,070 | Dalkowitz | July 13, 1943 |
| 2,373,370 | Bahr | Apr. 10, 1945 |